Feb. 22, 1949.  L. THOMPSON  2,462,439
CONTINUOUS PROCESS CAMERA
Filed March 28, 1946  3 Sheets-Sheet 1

INVENTOR.
LAWRENCE THOMPSON
BY *Victor J. Evans & Co.*
ATTORNEYS

Feb. 22, 1949.   L. THOMPSON   2,462,439
CONTINUOUS PROCESS CAMERA
Filed March 28, 1946   3 Sheets-Sheet 2
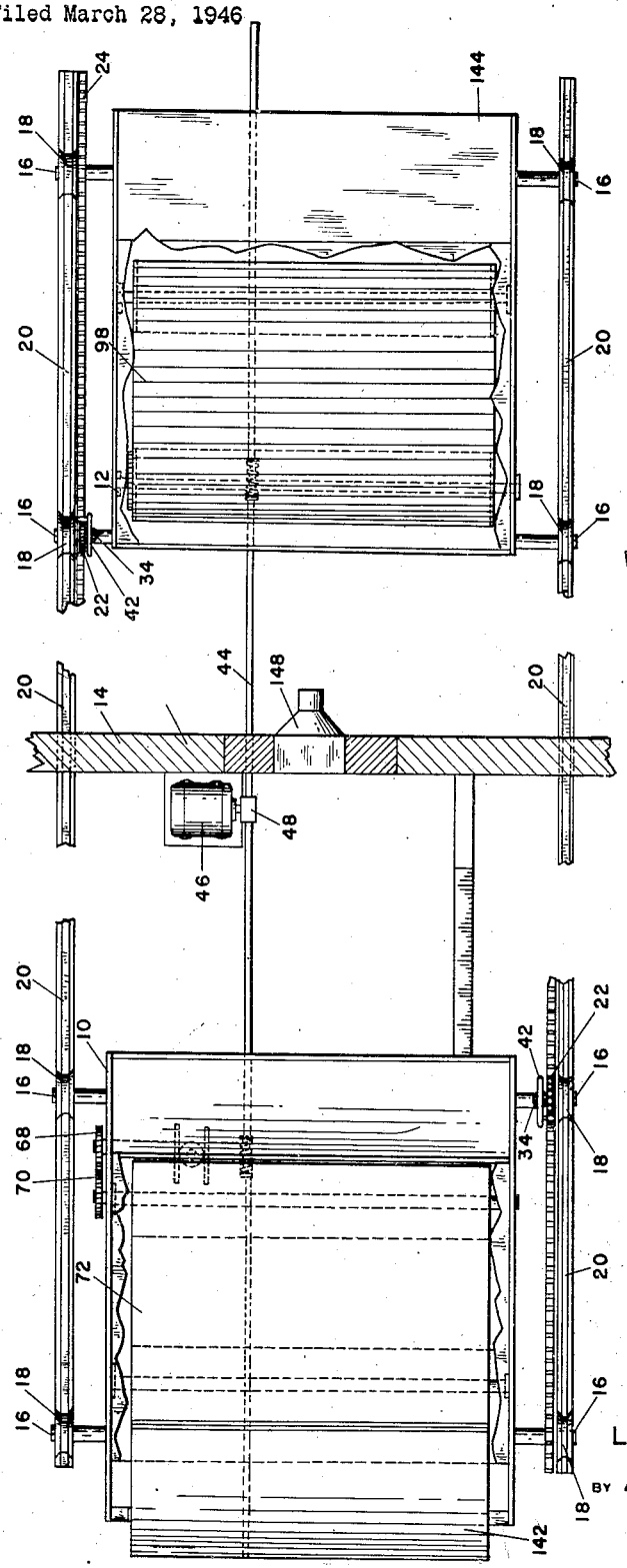
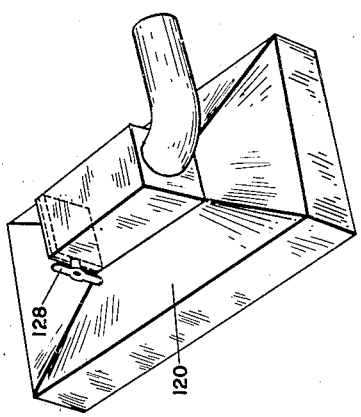
FIGURE 6
FIGURE 2.
*INVENTOR.*
LAWRENCE THOMPSON
BY *Victor J. Evans & Co.*
ATTORNEYS Feb. 22, 1949.   L. THOMPSON   2,462,439
CONTINUOUS PROCESS CAMERA
Filed March 28, 1946   3 Sheets-Sheet 3
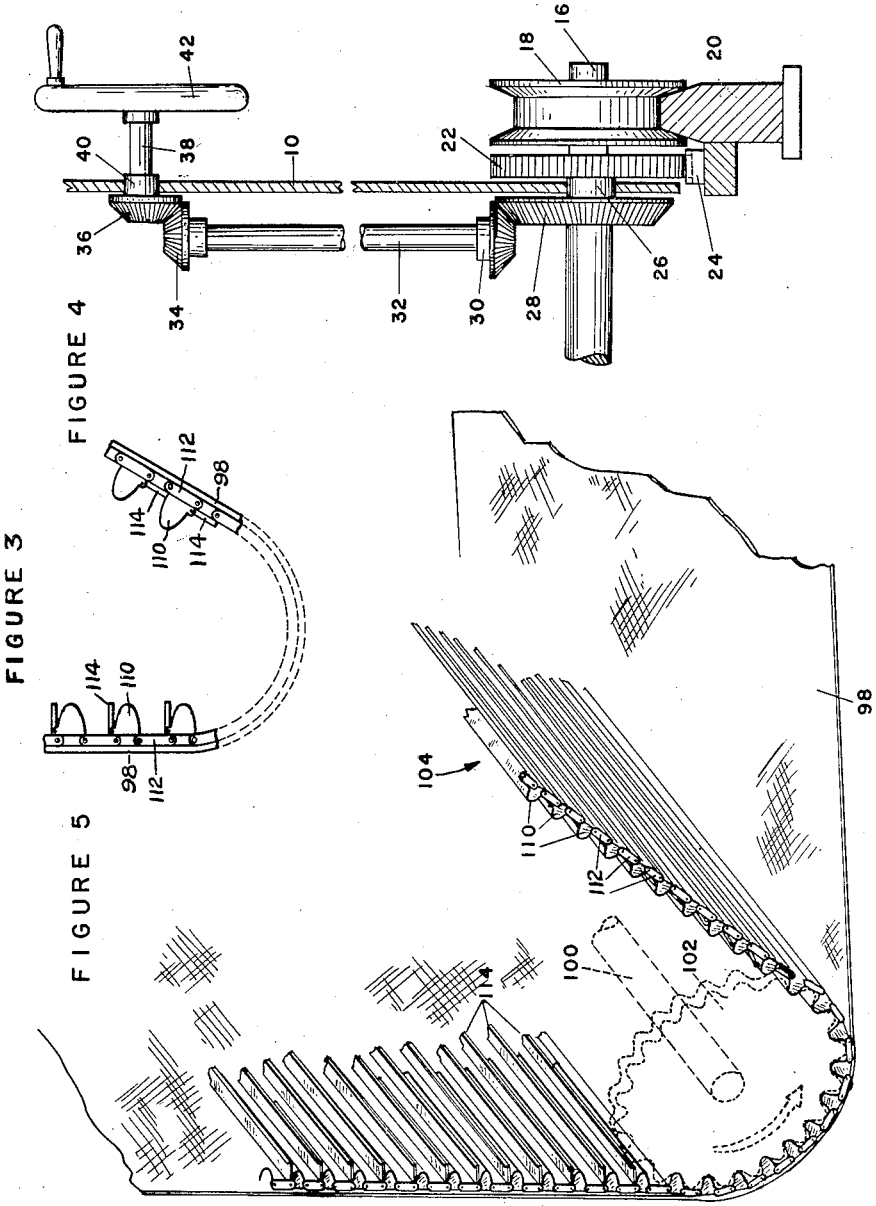
INVENTOR.
LAWRENCE THOMPSON
BY *Victor J. Evans & Co.*
ATTORNEYS Patented Feb. 22, 1949

2,462,439

UNITED STATES PATENT OFFICE 2,462,439

CONTINUOUS PROCESS CAMERA

Lawrence Thompson, Richmond Hill, N. Y.

Application March 28, 1946, Serial No. 657,664

1 Claim. (Cl. 271—45)

This invention relates to a continuous process camera which is especially adapted to make a continuous print of large maps, plans, tracings or similar articles instead of making such prints in sections as is done at the present time.

Another object of the invention is to provide a camera having two revolving curtains, one to hold the subject to be photographed and the other in the rear of the lens to support the sensitized paper.

The camera will make prints of various lengths and the prints are limited in size only by the width of the lens used. For instance using a forty inch lens the present camera could photograph a subject two hundred inches long and forty inches wide in a continuous print while cameras in use at the present time would have to make sectional prints of such a subject. Thus the width of the lens can be varied by different size lenses but the camera will take a continuous print according to the length of the subject. Smaller subjects could be inserted or fed into the camera without the necessity of setting the camera for each individual print.

The subject curtain will revolve at a constant speed but the speed of the sensitized paper curtain would be adjusted for full size, half size or double size for forward or reverse reading.

The exposure of the prints can be controlled by the speed of the curtains, lens aperture or by a shutter in the rear of the lens which by adjustment thereof will only partially expose the subject to the sensitized paper.

With the above and other objects and advantages in view the invention consists of the novel details of construction and arrangement of parts more fully hereinafter described, claimed and illustrated in the accompanying drawings in which:

Figure 2 is a top plan view partly in section and partly broken away.

Figure 3 is a detail illustrating the chain.

Figure 4 is an enlarged detailed sectional view of the curtain control of the camera.

Fig. 5 is a detailed fragmentary view of one of the curtains showing the curtain 98 partly separated from the chains for the purpose of illustration and Figure 6 is a perspective view of a suction pan.

Figure 1:
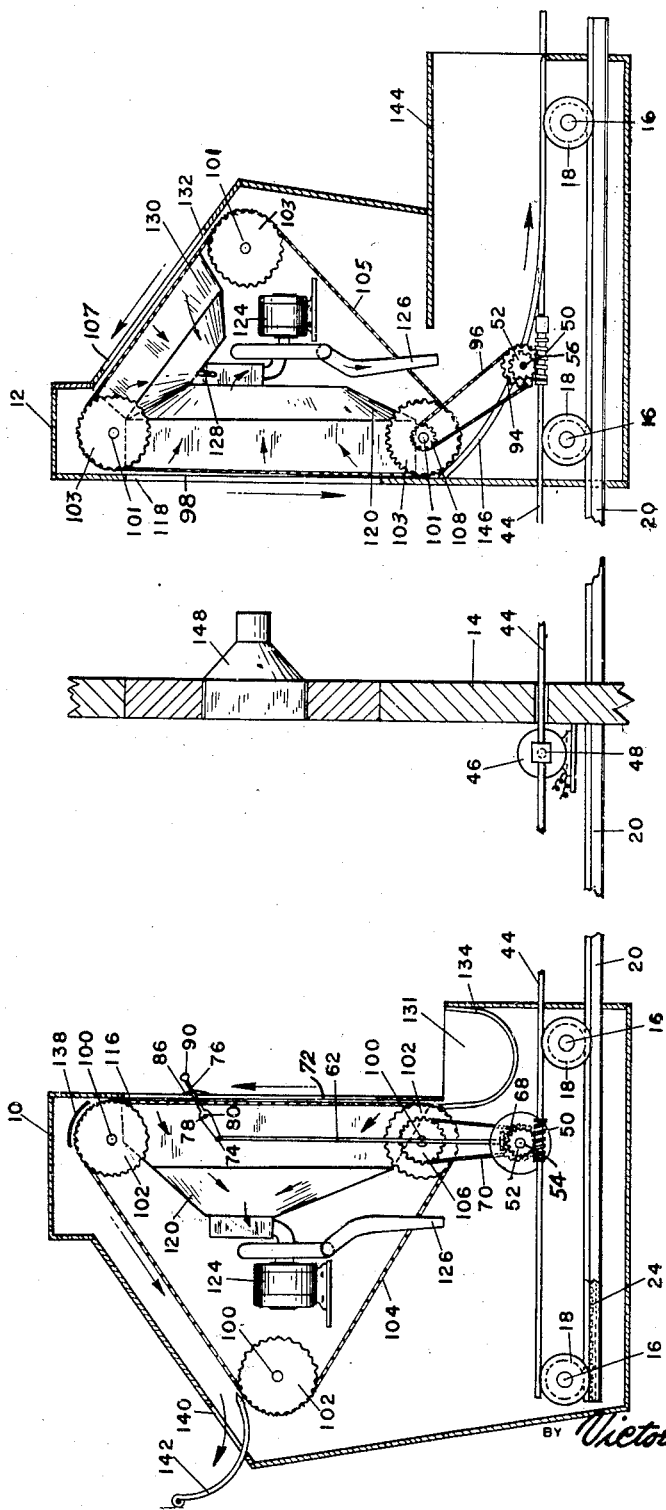
Figure 1 is a longitudinal sectional view of an embodiment of the invention.

Referring more in detail to the drawings the reference numeral 10 designates the housing for the sensitized paper and 12 the housing for the subject. The housings being separated by a dark room wall 14 as shown in Figure 1. Both housings have shafts 16 journalled transversely thereof on the ends of which are mounted the flange wheels 18 which engage the oppositely positioned track rails 20. The front axles of both housings on opposite ends thereof inwardly of the wheels 18, are provided with gears 22 which engage the racks 24 secured to their respective rails 20 in parallel relation thereto. Secured to the shafts in contact with the gears 22 are bearing bushings 26 by means of which the shafts are journalled in the housing. The other shafts are also mounted in this manner. Bevel gears 28 secured to the shafts engage the bushings 26 and engage or mesh with smaller bevel gears 30 fixed on the lower end of the vertical shaft 32 on the upper end of which is provided a bevel gear 34 similar in size to gear 30 which engages or meshes with a similar gear 36, fixed on the end of the shaft 38 which is journalled in the bearing bushings 40 in the housings and extending beyond the housings is provided on the free end thereof with hand wheels 42. Thus rotation of the hand wheels will adjust the housings with relation to the dark room wall and to each other.

Extending longitudinally of the housings is the square shaped drive shaft 44 which is driven by an electric motor 46 through clutch coupling 48. It will be noted that the motor is mounted on the dark side of the wall 14. The shaft can extend either below or above the track rails 20 as shown in the drawings without affecting the operation thereof.

Inwardly of the housings the shaft 44 is provided with worms 50 which engage gears 52 mounted on the shaft 54 which is journalled in the housing 10 and shaft 56 journalled in the housing 12. The shaft 54 is provided with a sprocket 68 that actuates a porous curtain 72 through a chain 70, which is trained over the sprocket 68 and a sprocket 106 on the shaft 100, and the shaft 56 is provided with a sprocket 94 that actuates a curtain 98 through a chain 96, that is trained over the sprocket 94 and a sprocket 108 on a shaft 101.

The endless porous curtain 72 is located in the housing 10 and arranged to travel around a triangular path supported by transverse shafts 100 with sprockets 102 thereon over which chains 104 travel.

The chains 104 positioned in opposite sides of the housing 10 are connected by transverse bars 110 the ends of which are connected to links 112 of the chains. Transverse baffle plates 114 are pivotally mounted, at the ends thereof, on the bars 110 and as the chains travel upwardly as indicated by the arrow on the face of the housing 10 the plates drop to horizontal positions as illustrated in Figure 3 thereby opening the areas between the bars whereas as the chains travel around the sprockets at the corner the plates drop into nested positions bridging the areas between the bars and shutting off openings through the chains. The curtain 72 fits snugly against the outer surfaces of the chains and is supported and carried by the chains. The face of the housing 10 is provided with a rectangular shaped opening 116 so that sensitized paper fed through the cradle 134 and opening 131 and carried upwardly by the curtain will be subjected to printing from the housing 12 through the lens 148.

The housing 12 which holds the subject to be printed is provided with a similar porous curtain 98 which also travels in a triangular shaped path formed by transversely positioned shafts 101 which are provided with sprockets 103 over which chains 105 are trained. The chains 105 are similar to the chains 104, illustrated in Figure 3 and the bars and plates are positioned so that the baffle plates 114 drop downwardly as the chains travel upwardly through the sloping path 107 whereby the exposed portion of the curtain 98, passing the opening 132 in the housing is subjected to suction which holds maps, pictures, or other sheet material against the surface of the curtain. The baffle plates 114 also drop outwardly to open the areas between the bars as the curtain 98 passes downwardly through the vertical path as indicated by the arrow at the face of the housing 12 so that the material will be held against the surface of the curtain as it passes the opening 118 in the housing and as the chains pass around the sprockets at the lower end the baffle plates will drop to closed position again bridging the areas between the bars as the chains travel upwardly through the lower section of the sloping path.

Mounted directly in the rear of the curtains are suction pans 120 which are of a slightly larger size than the openings of 116 and 118. The pans 120 are connected to suction pumps 124 which are provided with exhausts 126 and in housing 12 the pan is provided with a suction shut off valve 128 at the inner mouth of the funnel 130 which communicates with the pan 120. In Figure 1 the funnel 130 is shown mounted below the curtain 98, below the opening 132 in the top of the housing 12. The suction pans and funnel are used to retain the paper and subjects against the curtain which is made of porous material during rotation thereof.

In housing 10 the sensitized paper is placed in the cradle 134 in the front of the housing through the opening 131 and is trained over the curtain 72 passing under guide 138 at the upper end and passes out of the housing 10 by means of the opening 140 being guided there through by the arcuate guide plate 142.

In housing 12 the subjects are placed on the curtain 98 through the opening 132 and are discharged through the opening 144 in the rear of the housing 12 by means of the curved chute 146.

In the wall 14 intermediate the housings the lens 148 is mounted and the lens being of the conventional type can be adjusted as desired.

Thus a camera has been provided which by means of a continuous curtain will enable the operator thereof to take continuous prints of large subjects. The housings are susceptible of adjustment with regard to the lens and to each other and the speed of the curtain carrying the sensitized paper may be varied to take prints of various sizes. Controls can be led from the lens to the operator within the dark room so that the machine can be operated by one person.

It is believed that the construction and operation of the camera will be apparent to those skilled in the art and it is to be understood that changes in the details of construction, arrangement and combination of parts may be resorted to provided they fall within the spirit of the invention and the scope of the appended claim.

Having thus described the invention, what is claimed as new and desired to be secured by Letters Patent is:

In an apparatus of the character set forth, a pair of continuous chains, sprockets over which the chains are trained, spaced bars carried by the chains and extended between the chains, plates pivotally secured to the bars and positioned to close the areas between the bars in certain sections of the path of travel of the chains and adapted to drop downwardly to open said areas between the bars in other sections of travel of the chains, an endless curtain of porous material supported and conveyed by said spaced bars, said chains, bars and curtain traveling in a substantially triangular shaped endless path with part of said path vertically positioned, a pan having an open side facing and adjacent to the inner side of the vertical portion of the curtain, another pan adjacent to the inner side of an upper sloping portion of the curtain, said plates pivoted to open in the areas which are adjacent to the pans, and suction means within the pans to cause air to travel inwardly through said vertical and sloping portions of the curtain and between the plates so as to hold an article against the outer side of the curtain in said areas.

LAWRENCE THOMPSON.

REFERENCES CITED

The following references are of record in the file of this patent:

UNITED STATES PATENTS

| Number | Name | Date |
| --- | --- | --- |
| 1,106,504 | Floeter | Aug. 11, 1914 |
| 1,344,896 | Jobke | June 29, 1920 |
| 1,489,510 | Stromberg | Apr. 8, 1924 |
| 1,539,322 | Morton | May 26, 1925 |
| 1,701,317 | Stokes | Feb. 5, 1929 |
| 1,724,077 | Fleischer et al. | Aug. 13, 1929 |
| 2,292,521 | Hoin | Aug. 11, 1942 |
| 2,352,983 | Trump | July 4, 1944 |